US011104791B2

(12) United States Patent
Bills et al.

(10) Patent No.: US 11,104,791 B2
(45) Date of Patent: Aug. 31, 2021

(54) SURFACTANT COMPOSITION

(71) Applicant: Dow Global Technologies LLC, Midland, MI (US)

(72) Inventors: Robert R. Bills, Midland, MI (US); Patricia A. Peart, Ponca City, OK (US); Christian Piechocki, Marienthal (FR); Jay D. Romick, Midland, MI (US); Jamie L. Sullivan, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/517,264

(22) PCT Filed: Oct. 1, 2015

(86) PCT No.: PCT/US2015/053538
§ 371 (c)(1),
(2) Date: Apr. 6, 2017

(87) PCT Pub. No.: WO2016/057310
PCT Pub. Date: Apr. 14, 2016

(65) Prior Publication Data
US 2017/0306142 A1    Oct. 26, 2017

Related U.S. Application Data

(60) Provisional application No. 62/062,201, filed on Oct. 10, 2014.

(51) Int. Cl.
*C08L 63/00* (2006.01)
*C08G 59/06* (2006.01)
*C08G 59/24* (2006.01)

(52) U.S. Cl.
CPC ............ *C08L 63/00* (2013.01); *C08G 59/066* (2013.01); *C08G 59/245* (2013.01)

(58) Field of Classification Search
CPC ...... C08L 63/00; C08G 59/066; C08G 59/245
See application file for complete search history.

(56) References Cited

U.S. PATENT DOCUMENTS

| | | | |
|---|---|---|---|
| 3,018,262 A | 1/1962 | Schroeder | |
| 4,421,906 A | 12/1983 | Waddill et al. | |
| 4,423,201 A | 12/1983 | Hicks | |
| 4,950,792 A * | 8/1990 | Althaus | C08G 18/3814 564/331 |
| 5,118,729 A | 6/1992 | Piechocki | |
| 5,137,990 A | 8/1992 | Corley | |
| 5,405,688 A | 4/1995 | Decker et al. | |
| 5,602,193 A | 2/1997 | Stark | |
| 5,648,409 A | 7/1997 | Arora et al. | |
| 5,908,902 A * | 6/1999 | Pfeil | C08F 283/10 523/404 |
| 6,153,719 A | 11/2000 | Abbey et al. | |
| 6,221,934 B1 | 4/2001 | Stark et al. | |
| 6,242,083 B1 | 6/2001 | McGrail et al. | |
| 6,271,287 B1 | 8/2001 | Piechocki et al. | |
| 6,410,617 B1 | 6/2002 | Sulzbach et al. | |
| 6,451,898 B1 | 9/2002 | Tanimoto et al. | |
| 6,572,971 B2 | 6/2003 | Martin | |
| 6,632,893 B2 | 10/2003 | Konarski et al. | |
| 6,887,574 B2 | 5/2005 | Dean et al. | |
| 7,037,958 B1 | 5/2006 | Hansen et al. | |
| 7,163,973 B2 | 1/2007 | Ahsan | |
| 8,580,871 B2 | 11/2013 | Elmore et al. | |
| 2003/0082786 A1 * | 5/2003 | Ensor | C12N 9/0046 435/227 |
| 2005/0171237 A1 | 8/2005 | Patel et al. | |
| 2006/0099413 A1 * | 5/2006 | Lu | C09J 133/02 428/355 R |
| 2006/0293172 A1 | 12/2006 | Rubinsztajn et al. | |
| 2010/0304088 A1 * | 12/2010 | Steeman | C08G 59/68 428/156 |
| 2011/0114257 A1 * | 5/2011 | Kramer | C08L 63/00 156/281 |
| 2011/0306702 A1 * | 12/2011 | Klopsch | C08L 63/00 523/400 |
| 2012/0149805 A1 * | 6/2012 | Elmore | C08L 63/00 523/418 |

FOREIGN PATENT DOCUMENTS

| | | |
|---|---|---|
| WO | 2006/052727 A1 | 5/2006 |
| WO | 09110695 A1 | 9/2009 |

OTHER PUBLICATIONS

Durig, John D., "Comparisons of Epoxy Technology for Protective Coatings and Linings in Wastewater Facilities", Technology Publishing Company, c. 2000, JPCL May 2000, pp. 49-54.*
Odian, George, Principles of Polymerization, Third Edition, John Wiley & Sons, Inc., 1991, pp. 19-24.*
Author Unknown, Dow Answer Center, "Define Polyurethane Functionality, OH Number, and Equivalent Weigth", Answer ID 15855, Updated Oct. 23, 2019, https://Dowservice.custhelp.com/app/answers/detail/a_id/15855, pp. 1-3.*
Author Unknown, Dow Answer Center, "Dow Polyurethanes—Functionality, OH Number, and Equivalent Weight Definitions", Answer ID 13359, Updated Dec. 3, 2014, http://dowac.custhelp.com/app/answers/detail/a_id/13359/~/dow-polyurethanes---functionality,-oh-number,-and-dquivalent-weight-definitions, pp. 1-2.*
International Search Report for International Application No. PCT/US2015/0535038; International Filing Date: Oct. 1, 2015; dated Jan. 15, 2016; 3 pages.

(Continued)

*Primary Examiner* — Patrick D Niland
(74) *Attorney, Agent, or Firm* — Andrew E. Merriam

(57) ABSTRACT

An epoxy functionalized surfactant composition including a reaction product of: (a) a hydrophilic material and (b) an epoxy resin hydrophobe material having an average molecular weight of greater than about 370 Daltons; the above epoxy functionalized surfactant composition being used to prepare a waterborne epoxy dispersion composition including (A) the above epoxy functionalized surfactant composition, (B) an epoxy resin, and (C) water; and processes for preparing the epoxy functionalized surfactant composition and the above waterborne epoxy dispersion composition.

5 Claims, 2 Drawing Sheets

(56) References Cited

OTHER PUBLICATIONS

Written Opinion of the International Search Authority for International Application No. PCT/US2015/0535038; International Filing Date: Oct. 1, 2015; dated Jan. 15, 2016; 5 pages.
PEG 4600 Product Specification Sheet, Sigma-Aldrich.
Xingguo, Mei, "Biotechnology Pharmaceutical Preparations—Basics and Applications", Chemical Industry Press, Beijing, Oct. 2004, pp. 40-41.

* cited by examiner

"n" is the number of repeat units in the resin backbone.

SURFACTANT COMPOSITION

FIELD

The present invention is related to a surfactant composition useful, for example, in producing a waterborne epoxy dispersion composition.

BACKGROUND

Generally, epoxy functionalized surfactants are used to make waterborne epoxy dispersions wherein the surfactants are used to disperse epoxy resins such as for example novolacs, liquid epoxy resins (e.g., DER™ 330, a liquid epoxy resin [LER] commercially available from The Dow Chemical Company), and "1-Type" epoxy resins. Known epoxy functionalized non-ionic surfactants are typically functionalized with one or more epoxy groups from the above known epoxy resins. For example, some known epoxy reactive surfactants include the epoxy-functional polyether surfactants disclosed in U.S. Pat. Nos. 5,118,729; 4,421,906; 5,602,193; and 6,221,934.

When using the above known epoxy-functionalized non-ionic surfactants in dispersions, only a low solids level (e.g., less than about 65 weight percent (wt %) with a LER dispersion, less than about 60 wt % with a novolac dispersion, or less than about 55 wt % with a 1-Type dispersion) can be achieved unless additional solvents are used in such dispersions, and still concomitantly stay within a reasonable dispersion viscosity range (for example, a viscosity of less than [<] about 10 Pa-s).

U.S. Pat. No. 5,118,729 discloses a methoxy-polyethylene glycol epoxy functionalized surfactant (mono-ester) and an advanced resin that can be used as a hydrophobe. For example, U.S. Pat. No. 5,118,729 discloses DER 331 and DEN 438 and the mono-ester, and then dispersed functionalized epoxy resins. U.S. Pat. No. 5,118,729 does not disclose matching the epoxy functionality of the dispersant with the epoxy resin, or what effect the molecular weight (Mw) of the hydrophobe has on the dispersion characteristics.

U.S. Pat. No. 8,580,871 discloses a process of preparing an epoxy functionalized surfactant by first reacting an amidoamine with an acid-terminated polyoxyalkylene polyol. Then, the epoxy functionalized surfactant is reacted with an epoxy to make a non-ionic epoxy functionalized surfactant which, in turn, can be used to disperse an epoxy resin. The epoxy-functionalized surfactant may be further reacted with amine compounds such that the resultant reaction product can be used as a curing agent. The epoxy resin can be liquid or polymeric. Potential epoxy resin candidates listed in U.S. Pat. No. 8,580,871 include aromatic, aliphatic, and novolac epoxies or mixtures thereof. The surfactant can be made separately, or in situ. U.S. Pat. No. 8,580,871 does not disclose changing the functionality of the epoxy hydrophobe in the surfactant, or its impact on dispersion properties. U.S. Pat. No. 8,580,871 also does not teach reducing the viscosity of the dispersion, or an improved dispersion stability of the dispersion in the presence of alcohol. The surfactant can be made in situ with the resin being dispersed, however U.S. Pat. No. 8,580,871 does not teach tailoring the hydrophobe to the epoxy resin, nor the effect of tailoring the hydrophobe on the dispersion performance.

U.S. Pat. No. 4,423,201 discloses a process for making an epoxy-functionalized surfactant by reacting an aliphatic polyether glycol (PEG) with diisocyanate and a dihydric phenol. The Mw of the PEG varies from about 800 to about 20,000. U.S. Pat. No. 4,423,201 discloses matching the aliphatic, or aromatic, nature of the diisocyanate with a similar nature of epoxide. Useful PEGs include ethylene oxide (EO)/propylene oxide (PO) block copolymers (which have a viscosity in the range of from about 5,000 to about 10,000 mPa-s) containing 50 wt % to 90 wt % EO. The process of U.S. Pat. No. 4,423,201 includes reacting isocyanate with glycol until all of the isocyanate groups are gone, and then co-reacting with the diglycidyl ether (DGE) of a dihydric phenol and a dihydric phenol (e.g., bisphenol A). U.S. Pat. No. 4,423,201 does not disclose changing the hydrophobe Mw, or matching the hydrophobe to the resin being dispersed. Examples disclosed in the above patent use a liquid epoxy resin in surfactant.

U.S. Pat. No. 5,602,193 discloses an epoxy functionalized polyether surfactant which allows for epoxy dispersions with particle sizes of <1 micron. The epoxy groups are symmetrically linked to either end of an EO or EO/PO chain (A and B). The two compounds (A and B) consist of EO and/or EO/PO chains with ester groups on either side. These are aliphatic molecules. The Mw of the surfactant is from 1,000 to 40,000; and preferably between 2,000 and 20,000. U.S. Pat. No. 5,602,193 describes reacting a carboxylic acid on the oxidized polyol chain with the epoxide group to form the surfactant. Oxidized polyalkylene glycols are preferred (e.g., some combination of EO, PO, butylene oxide [BO]). U.S. Pat. No. 5,602,193 discloses the use of aliphatic or aromatic epoxy resins; and uses a liquid epoxy resin (having an EEW of approximately 190) in synthesizing the surfactant. However, U.S. Pat. No. 5,602,193 does not disclose a variety of different resins useful as a hydrophobe for surfactants, or the impact such hydrophobes have on the dispersion or its performance properties.

U.S. Pat. No. 5,648,409 discloses a self-dispersing epoxy consisting of a resin reacted with a certain amount of a polyalkyleneamine, where the alkylene portion consists of EO and/or PO groups with a Mw from about 2,000 to about 10,000 (e.g., Jeffamine M-2070) to make an epoxy/amine adduct. Bisphenol A-based and novolac epoxy resins, with an EEW of less than about 400 (e.g., DER331) are used. U.S. Pat. No. 5,648,409 does not disclose varying the hydrophobe portion of the surfactant, or the affect such hydrophobe has on dispersion properties.

U.S. Pat. No. 6,410,617 discloses a process for making an epoxy-functionalized surfactant by reacting a carboxylic acid ester (e.g., diethyl maleate) with a polyalkylene glycol amine (e.g., Jeffamine 2070), followed by adding and reacting bisphenol A and a liquid epoxy resin. The resultant surfactant is diluted with propoxyethanol. U.S. Pat. No. 6,410,617 does not disclose changing the hydrophobe Mw or the impact such hydrophobe of a certain Mw has on dispersion/performance properties.

SUMMARY

One embodiment of the present invention is directed to an epoxy functionalized surfactant composition including a reaction product of: (a) a hydrophilic material and (b) a hydrophobe, wherein the hydrophobe is an epoxy resin having an average Mw of greater than about 370 daltons (Da) as measured by gel permeation chromatography (GPC).

Another embodiment of the present invention is directed to a waterborne epoxy dispersion composition including: (A) the above epoxy functionalized surfactant composition; (B) an epoxy resin; and (C) water.

Still other embodiments of the present invention include a process for preparing the above epoxy functionalized surfactant composition and a process for preparing the above waterborne epoxy dispersion composition.

The present invention includes, in part, the discovery of a surfactant composition that uses a hydrophobe, component (b), having an average Mw greater than 370 Da, such as DER 664, in preparing the epoxy functionalized surfactant composition. Then, when a waterborne epoxy dispersion composition is prepared using the above surfactant composition of the present invention dispersed in an epoxy resin, the resultant viscosity of the waterborne epoxy dispersion composition can be lower than the viscosity of a conventional waterborne epoxy dispersion composition using a lower Mw hydrophobe based surfactant. Other benefits, advantages, and objectives of the present invention are discussed herein.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION

Figure 1:
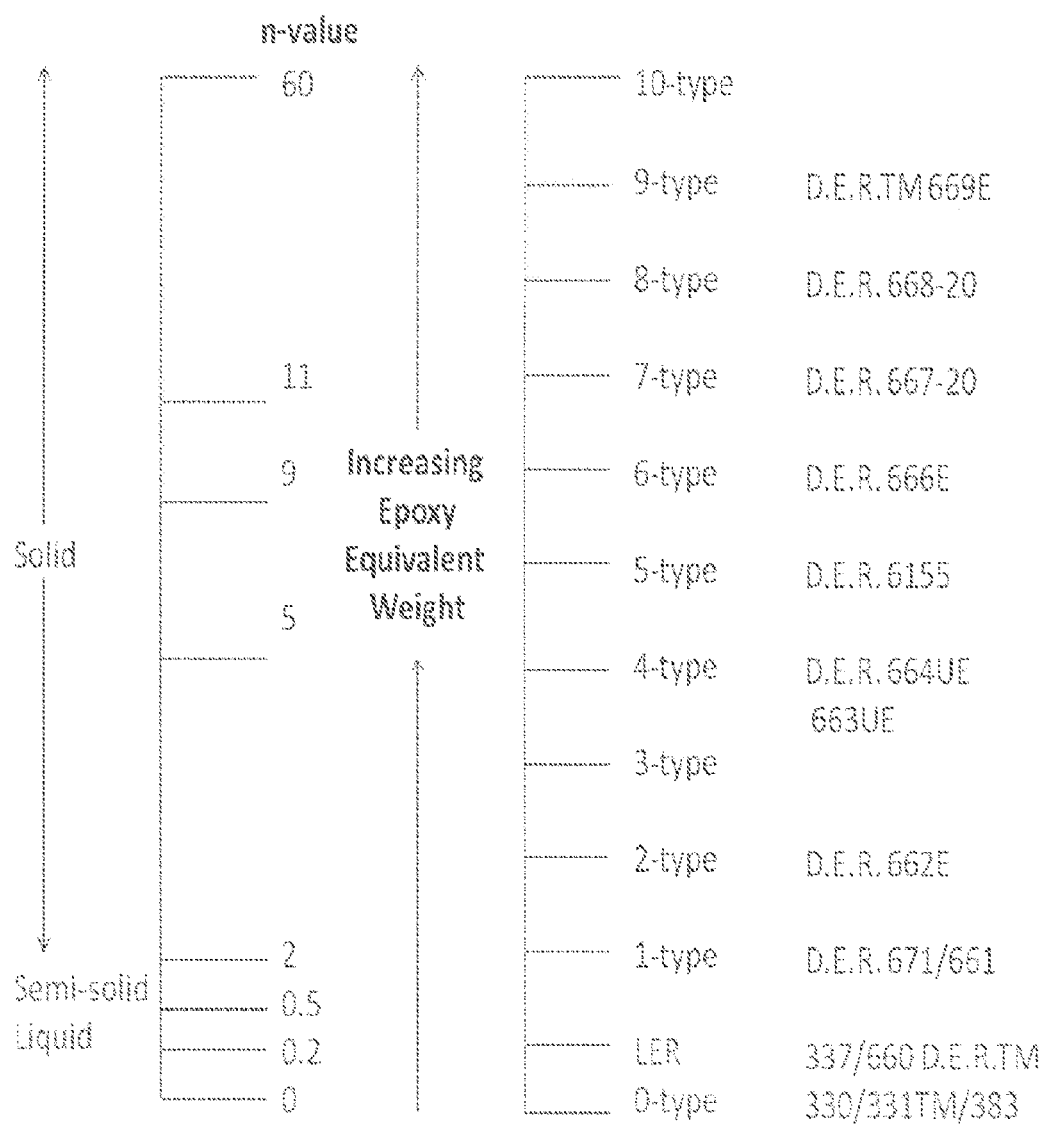
FIG. 1 is a schematic chart showing the designation of various epoxy resin polymers using the term "Type" relative to the EEW and the n-value of the repeating groups in the backbone of an epoxy resin polymer.

The terms "1-Type", "4-Type" and other "Types", with reference to an epoxy resin, are terms related to epoxy resins that are well known in the art. The terms can be used interchangeably with designations such as "Type-1", "Type-2", etc. There is no strict definition of what constitutes a "1-Type" resin or a "2-Type" resin etc., however, those skilled in the art can follow FIG. 1 as a guideline wherein FIG. 1 shows the "Type" resin relative to the EEW and the n-value of the repeating groups in the backbone of an epoxy resin polymer such as for example an epoxy resin having the following chemical formula of Structure (I):

Structure (I)

One broad embodiment of the present invention is directed to providing an epoxy-functionalized surfactant composition including a reaction product of at least: (a) a hydrophilic material and (b) a hydrophobic material (or "hydrophobe compound").

In one embodiment, the hydrophilic material, component (a), useful in preparing the epoxy functionalized surfactant composition of the present invention may include one or more conventional hydrophilic materials known in the art. For example, the hydrophilic material may include alkyl glucosides, glycerols, alkyl esters, fatty alcohols, alkyl glycols, ethoxylated linear alcohols, ethoxylated alkyl phenols, fatty acid esters, amine and amide derivatives, ethylene oxide copolymers, propylene oxide copolymers, polyalcohols, ethoxylated polyalcohols, thiols, and mixtures thereof. The hydrophilic material, in general, has an average Mw of from about 100 to about 20,000 in one embodiment; from about 500 to about 10,000 in another embodiment; and from about 1,400 to about 8,000 in still another embodiment.

Other hydrophilic materials, component (a), useful in preparing the epoxy functionalized surfactant composition of the present invention may include for example:

(i) R—O(CH$_2$—CH$_2$—O)$_n$CH$_2$—CH$_2$—OH wherein R can be a methyl group, an ethyl group, or a C3-C20 group and n can be from 1 to 452;

(ii) R—O(CH$_2$—CH$_2$—O)$_n$[X]$_m$—OH wherein R and n are as defined above, X can be CH$_2$—CH CH$_3$, CH$_2$—CH$_2$—CH$_2$—, CH$_3$—CH$_2$—CH$_2$—CH$_2$—O, a C5 to C20 linear group or ramified R—O(CH$_2$—CH$_2$—O)$_n$[X]$_m$—(CH$_2$—CH$_2$—O)$_n$—OH, wherein R, X, and n are as defined above and m can be from 0 to 474;

(iii) HO(CH$_2$—CH$_2$—O)$_n$—OH HO(CH$_2$—CH$_2$—O)$_n$—[X]$_m$OH wherein X can be CH$_2$—CH CH$_3$, CH$_2$—CH$_2$—CH$_2$—, CH$_3$—CH$_2$—CH$_2$—CH$_2$—O, a C5 to C20 linear group or ramified HO(CH$_2$—CH$_2$—O)$_n$[X]$_m$—(CH$_2$—CH$_2$—O)$_n$—OH wherein X, n and m are as defined above;

(iv) HO—[X]$_m$—(CH$_2$—CH$_2$—O)$_n$—[X]$_{m'}$—OH OH wherein X, n, and m are as defined above and m' can be from 0 to (474-m); and (v) mixtures thereof.

In one preferred embodiment, the hydrophilic material includes an alkylene glycol having an average Mw of from about 500 to about 20,000 in one embodiment and from about 1,000 to about 15,000 in another embodiment and from about 1,400 to about 10,000 in another embodiment and from about 3,000 to about 8,000 in another embodiment and from about 4,000 to about 5,000 in another embodiment. The alkylene glycol can be for example polyethylene glycol.

Generally, the amount of the hydrophilic material, component (a), used in preparing the epoxy functionalized surfactant composition of the present invention may be in the range of from about 95 wt % to about 5 wt % in one embodiment, from about 78 wt % to about 22 wt % in

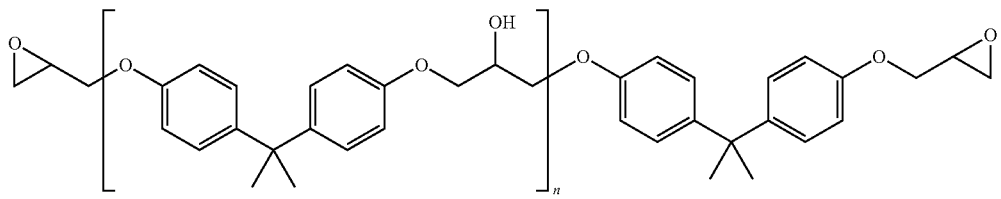

another embodiment, from 45 wt % to about 22 wt % in still another embodiment, and from 40 wt % to about 30 wt % in yet another embodiment. When the amount of the hydrophilic material used is above 95 wt %, the surfactant is too hydrophilic and migrates to the water phase instead of staying at the particle interface. The viscosity, when the surfactant prefers the water phase, is dramatically higher than if the surfactant is properly tied to the particle. When the amount of the hydrophilic material used is less than 5 wt %, the surfactant provides insufficient steric stabilization; and thus, making a shelf stable dispersion longer than a few weeks becomes much more difficult without adding a large percentage of additional external surfactant to the resin blend.

In the above first embodiment, the epoxy-functionalized surfactant composition includes the reaction product of at least: (a) a hydrophilic material and (b) hydrophobe compound; and the hydrophilic material, component (a), comprises one, two or more individual hydrophilic compounds, and the hydrophobic material, component (b), comprise one, two or more individual compounds reacted together.

In another second embodiment, the hydrophilic material, component (a), useful in preparing the epoxy functionalized surfactant composition of the present invention may include a precursor material or intermediate material that is prepared separately and apart from the hydrophobe compound, component (b), before reacting the hydrophilic material with the hydrophobe compound. In this instance, the hydrophilic material as a precursor material or intermediate product may be prepared first and then reacted with the hydrophobe compound. For example, the hydrophilic precursor material can be a reaction product of: (i) an alkylene glycol compound and (ii) an anhydride compound.

In still another third embodiment, the epoxy-functionalized surfactant composition may include the reaction product of: (i) an alkylene glycol compound, (ii) an anhydride compound, and (iii) a hydrophobe compound. In this in situ type embodiment; (i) an alkylene glycol compound, (ii) an anhydride compound, and (iii) a hydrophobe compound are blended together and reacted to form the epoxy functionalized surfactant composition.

In carrying out a preferred embodiment of the present invention, the above second embodiment is used, wherein the hydrophilic material is first prepared prior to reacting the hydrophilic material with the hydrophobe compound. As aforementioned, the hydrophilic material precursor may be prepared by reacting: (i) an alkylene glycol compound, and (ii) an anhydride compound.

The alkylene glycol compound, component (i), useful in preparing the hydrophilic material used to prepare the surfactant composition of the present invention may include one or more alkylene glycol compounds. For example the alkylene glycol compound may include polyethylene glycol, methoxy polyethylene glycol, polyethylene oxide, polyoxyethylene, and mixtures thereof. In one preferred embodiment, the alkylene glycol compound includes polyethylene glycol.

Generally, the amount of alkylene glycol compound used in preparing the hydrophilic material of the present invention may be in the range of from about 4 wt % to about 70 wt % in one embodiment, from about 19 wt % to about 60 wt % in another embodiment, and from 25 wt % to about 50 wt % in still another embodiment. The amount of alkylene glycol compound used in the present invention may change with the different surfactant and different hydrophobic group used; and the different stoichiometric ratios used. However, generally when using an amount of alkylene glycol compound at a level below about 5 wt %, the amount of surfactantcy is too low to create a small particle sized, stable dispersion. And generally, when using an amount of alkylene glycol compound at a level above about 70 wt %, the hydrophilic portion is too great and becomes too water soluble to stay at the interface of the water and particle.

The anhydride compound, component (ii), useful in preparing the hydrophilic material, which in turn, is used to prepare the surfactant composition of the present invention, may include any number of anhydride compounds including for example the compounds disclosed in U.S. Pat. No. 5,118,729, incorporated herein by reference.

For example, the linking group is the residue of a compound which is capable of reacting with both the primary hydroxy moiety of a monoalkyl ether of a polyethylene glycol, and a 1,2-epoxy moiety of a polyglycidyl ether of a polyhydroxy hydrocarbon. Any compound that has both (1) a moiety reactive with a hydroxy moiety and (2) a moiety reactive with a glycidyl moiety can be used. In a preferred embodiment such a compound is a dicarboxylic acid or an anhydride of a dicarboxylic acid. Preferred dicarboxylic acids or anhydrides of dicarboxylic acids correspond to one of the following formulas (II) or (III):

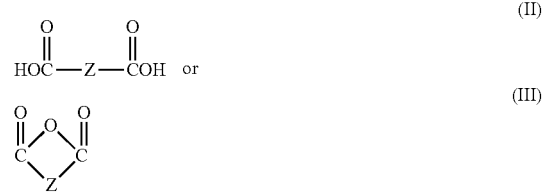

wherein Z is a C1-C20 hydrocarbylene moiety. In this embodiment, X is represented by formula (IV), wherein the carbonyl moiety is bound to the residue of the poly(oxyethylene) monoalkyl ether.

Preferably Z is C1-C20 alkylene, C3-C20 cycloalkylene, C4-C20 alkylene substituted cycloalkylene, C arylene, or C7-C20 alkyl substituted arylene. More preferably Z is C1-C20 alkylene C5-C6 cycloalkylene, C6-C12 arylene, C7-C20 alkylene substituted cycloalkylene or C7-C20 alkyl-substituted arylene. In a most preferred embodiment Z corresponds to the following formulas (V) or (VI):

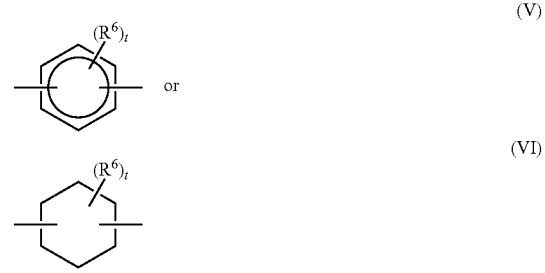

wherein $R^6$ is C1-C10 alkyl, and t is 0 or 1. Preferably, $R^6$ is C1-C3 alkyl; and most preferably methyl. Among preferred anhydrides useful in the present invention include the following: phthalic anhydride; 1,2,5,6-tetrahydrophthalic anhydride; 3-methylhexahydrophthalic anhydride; 3-ethylhexahydrophthalic anhydride; and mixtures thereof. The anhydrides are preferred over the carboxylic acids, and the cycloaliphatic anhydrides are more preferred because the cycloaliphatic anhydrides provide a product which is more stable to hydrolysis than aromatic anhydrides. The 3-alkyl-hexahydrophthalic anhydrides are the most preferred because of their high stability. Of the alkylhexahydrophthalic anhydrides useful in the present invention, 3-methyl-hexahydrophthalic anhydride is currently the most readily available. In another embodiment, the anhydride compound may include a succinic anhydride.

Generally the amount of anhydride compound used in the present invention may change with the different surfactant and different hydrophilic group used; and the different stoichiometric ratios used. However, ideally when choosing an anhydride level, maintaining a stoichiometric ratio with the hydrophilic component between about 0.8:1 to about 1.2:1 is preferred. In general, using a 1:1 ratio gives the optimal reaction and completion of the reaction can be monitored effectively. Operating further away from 1:1 can create unknown side reactions with the hydrophobe.

Generally, the amount of the hydrophilic material comprising the reaction product of (i) an alkylene glycol compound and (ii) an anhydride compound when used in preparing the epoxy functionalized surfactant composition of the present invention may be in the range of from about 5 wt % to about 95 wt % in one embodiment, from about 10 wt % to about 80 wt % in another embodiment, and from 20 wt % to about 40 wt % in still another embodiment. The amount of hydrophilic material used in the present invention may change with the different surfactant and different hydrophobic group used; and the different stoichiometric ratios used. However, generally when using a level below about 5 wt %, the amount of hydrophilic chain length is too low to create a surface active material. And generally, when using a level above about 95 wt %, the water solubility of the surfactant is such the material is more likely to stay in the water phase and not at the surface of the particle.

The hydrophobe, component (b), useful for preparing the epoxy functionalized surfactant composition of the present invention, may include a wide variety of epoxy compounds. The epoxy resin hydrophobe useful in preparing the epoxy functionalized surfactant composition of the present invention may include one epoxy resins or a mixture of two or more epoxy resins. For example, in general, the epoxy resin hydrophobe may include epoxy compounds or polyepoxides selected from aliphatic compounds, cycloaliphatic compounds, aromatic compounds, hetero-cyclic compounds, and mixtures thereof. In one embodiment, epoxy compounds may contain, on the average, one or more reactive oxirane groups. Epoxy resins useful in the embodiments described herein may include for example mono-functional epoxy resins, multi- or poly-functional epoxy resins, and combinations thereof. The epoxy resins useful as the epoxy resin hydrophobe of the present invention and the preparation of such epoxy resins are disclosed, for example, in Lee, H. and Neville, K., Handbook of Epoxy Resins, McGraw-Hill Book Company, New York, 1967, Chapter 2, pages 2-1 to 2-27, incorporated herein by reference.

The epoxy resins, used in embodiments disclosed herein for the hydrophobe component (b) of the present invention, may vary and include conventional and commercially available epoxy resins. The epoxy resin component used herein may include a single epoxy resin compound used alone or a mixture of two or more epoxy compounds used in combination. The epoxy resin, also referred to as a polyepoxide, may be a product that has, on average, more than one unreacted epoxide unit per molecule. In selecting the epoxy resin for the hydrophobe disclosed herein, consideration should be given to properties of the final product, and to the viscosity and other properties that may influence the processing of the surfactant composition.

Suitable conventional epoxy resin compounds utilized in the present invention may be prepared by processes known in the art, such as for example, a reaction product based on the reaction of an epihalohydrin and (1) a phenol or a phenol type compound, (2) an amine, or (3) a carboxylic acid. Suitable conventional epoxy resins used herein may also be prepared from the oxidation of unsaturated compounds. For example, epoxy resins used herein may include reaction products of epichlorohydrin with polyfunctional alcohols, phenols, bisphenols, halogenated bisphenols, hydrogenated bisphenols, novolac resins, o-cresol novolacs, phenol novolacs, polyglycols, polyalkylene glycols, cycloaliphatics, carboxylic acids, aromatic amines, aminophenols, or combinations thereof. The preparation of epoxy compounds is described for example in Kirk-Othmer, Encyclopedia of Chemical Technology, 3rd Ed., Volume 9, pages 267-289.

In one embodiment, suitable phenol, phenol-type or polyhydric phenol compounds useful for reacting with an epihalohydrin to prepare an epoxy resin include, for example, the polyhydric phenol compounds having an average of more than one aromatic hydroxyl group per molecule such as, for example, dihydroxy phenols; biphenols; bisphenols such as bisphenol A, bisphenol AP (1,1-bis(4-hydroxyphenyl)-1-phenyl ethane), bisphenol F, or bisphenol K; halogenated biphenols such as tetramethyl-tetrabromobiphenol or tetramethyltribromobiphenol; halogenated bisphenols such as tetrabromobisphenol A or tetrachlorobisphenol A; alkylated biphenols such as tetramethylbiphenol; alkylated bisphenols; trisphenols; phenol-aldehyde novolac resins (i.e., the reaction product of phenols and simple aldehydes, preferably formaldehyde) such as phenol-formaldehyde novolac resins, alkyl substituted phenol-formaldehyde resins, phenol-hydroxybenzaldehyde resins, alkylated phenol-hydroxybenzaldehyde resins, or cresol-hydroxybenzaldehyde resins; halogenated phenol-aldehyde novolac resins; substituted phenol-aldehyde novolac resins; phenol-hydrocarbon resins; substituted phenol-hydrocarbon resins; hydrocarbon-phenol resins; hydrocarbon-halogenated phenol resins; hydrocarbon-alkylated phenol resins; resorcinol; catechol; hydroquinone; dicyclopentadiene-phenol resins; dicyclopentadiene-substituted phenol resins; or combinations thereof.

In another embodiment, suitable amines useful for reacting with an epihalohydrin to prepare an epoxy resin include, for example, diaminodiphenylmethane, aminophenol, xylene diamine, anilines, or combinations thereof.

In still another embodiment, suitable carboxylic acids useful for reacting with an epihalohydrin to prepare an epoxy resin include, for example, phthalic acid, isophthalic acid, terephthalic acid, tetrahydro- and/or hexahydrophthalic acid, endomethylenetetrahydrophthalic acid, isophthalic acid, methylhexahydrophthalic acid, or combinations thereof.

A few non-limiting embodiments of the epoxy resin useful in the present invention include, for example, aliphatic epoxides prepared from the reaction of epihalohydrins and polyglycols such as trimethylpropane epoxide;

diglycidyl-1,2-cyclohexane dicarboxylate, or mixtures thereof; diglycidyl ether of bisphenol A; diglycidyl ether of bisphenol F; resorcinol diglycidyl ether; triglycidyl ethers of para-aminophenols; halogen (for example, chlorine or bromine)-containing epoxy resins such as diglycidyl ether of tetrabromobisphenol A; epoxidized phenol novolac; epoxidized bisphenol A novolac; an oxazolidone-modified epoxy resin; an epoxy-terminated polyoxazolidone; and mixtures thereof.

Suitable commercially available epoxy resin compounds utilized in the present invention may be for example, epoxy resins commercially available from The Dow Chemical Company such as the D.E.R.™ 300 series, the D.E.N.™ 400 series, the D.E.R.™ 500 series, the D.E.R.™ 600 series and the D.E.R.™ 700 series of epoxy resins. Examples of bisphenol A based epoxy resins useful in the present invention include commercially available resins such as D.E.R.™ 300 series and D.E.R.™ 600 series, commercially available from The Dow Chemical Company. Examples of epoxy novolac resins useful in the present invention include commercially available resins such as D.E.N.™ 400 series, commercially available from The Dow Chemical Company.

For example, as one illustrative embodiment of the present invention, the epoxy resin may be a liquid epoxy resin, such as D.E.R. 383 a diglycidylether of bisphenol A (DGEBPA) having an epoxide equivalent weight of from about 175 to about 185, a viscosity of about 9.5 Pa-s and a density of about 1.16 grams/cubic centimeters. Other commercial epoxy resins that can be used for the epoxy resin component can be, for example, D.E.R. 330, D.E.R. 354, D.E.R. 332, or combinations thereof.

Other suitable epoxy resins useful as component (b) are disclosed in, for example, U.S. Pat. Nos. 3,018,262; 7,163,973; 6,887,574; 6,632,893; 6,242,083; 7,037,958; 6,572,971; 6,153,719; and 5,405,688; PCT Publication WO 2006/052727; U.S. Patent Application Publication Nos. 20060293172 and 20050171237, each of which is hereby incorporated herein by reference. Examples of epoxy resins and their precursors suitable for use in the present invention are also described, for example, in U.S. Pat. Nos. 5,137,990 and 6,451,898, which are incorporated herein by reference.

A preferred embodiment of the epoxy resin hydrophobe that may be used in the present invention includes diglycidyl ether of bisphenol A, novolac, a 1-Type epoxy resin, and mixtures thereof.

In another preferred embodiment, commercially available epoxy resins (available from The Dow Chemical Company) that can be used according to the present invention may include for example DER™ 330, DER™ 331, DER™ 661, DER™ 664, DER™ 667, DEN™ 438, DER™ 354, and mixtures thereof.

Generally, the amount of epoxy resin used for preparing the epoxy functionalized surfactant composition of the present invention is determined by the functionality of the hydrophilic group and the stoichiometric ratio of the hydrophilic group to the hydrophobic group. This amount of epoxy resin may be in the range of from about 10 wt % to about 85 wt % based on the total weight of the resin forming components of the composition in one embodiment, from about 20 wt % to about 75 wt % in another embodiment, and from 40 wt % to about 65 wt % in still another embodiment. The amount of epoxy resin used in the present invention may change with the different surfactant and different hydrophobic group used; and the different stoichiometric ratios used. However, generally when using a level below about 10 wt %, the surfactant is too water soluble to remain surface active. And generally when using a level above about 85 wt %, the steric stabilization is too small to have an effective surfactant.

It is important that the epoxy resin hydrophobe used in the present invention have a preferred Mw such that the epoxy functionalized surfactant composition of the present invention and the waterborne epoxy dispersion composition of the present invention exhibit the performance properties contemplated by the present invention. In general, the Mw of the epoxy resin hydrophobe should be greater than or equal to the resin being dispersed using the epoxy functionalized surfactant composition prepared from the epoxy resin hydrophobe. For example, the Mw of the epoxy resin hydrophobe may be generally greater than about 370 Da in one embodiment; from about 370 Da to about 4,000 Da in another embodiment, from about 800 Da to about 4,000 Da in still another embodiment, and from about 900 Da to about 2,000 Da in yet another embodiment.

The hydrophilic material, component (a); and the epoxy resin hydrophobe, component (b), are preferably selected such that neither the hydrophilic material nor the epoxy resin hydrophobe, self polymerizes to generate a molecule with a Mw greater than the above-mentioned Mw; or to generate an epoxy functionalized surfactant composition product with a Mw greater than the above-mentioned Mw.

In general, the Mw of the epoxy functionalized surfactant composition of the present invention, can be greater than about 1,500 Da in one embodiment; from about 3,000 Da to about 16,000 Da in another embodiment, from about 4,000 Da to about 12,000 Da in still another embodiment, and from about 5,000 Da to about 10,000 Da in yet another embodiment.

In a preferred embodiment, one or more suitable reaction catalysts may optionally be employed in the practice of the present invention. Catalysts used to prepare the compositions of the present invention may be selected, for example, from one or more of, metal salts such as an alkali metal salt or an alkaline earth metal salt, a tertiary amine, a quaternary ammonium salt, a quaternary phosphonium salt, a phosphine and the like, and mixtures thereof. Preferably, the catalyst used in the present invention is ethyltriphenylphosphonium acetate, any aliphatic or aromatic substituted phenylphosphonium bromide or mixtures thereof.

The optional reaction catalyst is generally employed in an amount of from 0 wt % to about 10 wt %, from about 0.01 wt % to about 10 wt %; preferably from about 0.05 wt % to about 5 wt %, most preferably from about 0.1 wt % to about 4 wt %, weight percent based on the combined weight of monomer compounds used.

The process of making the epoxy functionalized surfactant composition includes the step of reacting the hydrophilic material described above and the epoxy resin hydrophobe described above under reaction conditions such that an epoxy functionalized surfactant composition is formed. For example, in one embodiment, the process useful for preparing the surfactant can be a process as described in WO9110695, incorporated herein by reference.

In another embodiment, the reaction to form the epoxy functionalized surfactant composition is carried out such that the residual acid level in the reaction mixture containing the epoxy functionalized surfactant composition product is for example from zero or very close to zero at the end of the synthesis process. Generally, the residual acid level in the epoxy functionalized surfactant composition of the present invention may be less than about 0.1 wt % in one embodiment, less than about 0.01 wt % in another embodiment, and less than about 0.001 wt % in still another embodiment. If the residual acid level is at higher levels than about 0.1 wt %, the PEG/epoxy/anhydride may not be converted to the desired product. Free acid-ester that is not fully reacted with the epoxy will continue to slowly react after synthesis is ended or remain in the water phase acting as a thickening agent which is undesirable.

As aforementioned, in another embodiment, the reaction is carried out such that the hydrophilic material and the epoxy resin hydrophobe, do not self polymerize to create high molecular weight species. For example the resulting reaction product preferably has Mw of less than about 500,000 Da, more preferably less than about 100,000 Da, and most preferably less than about 70,000 Da.

All of the components used to prepare the epoxy functionalized surfactant composition are typically mixed and dispersed at a temperature enabling the preparation of an effective surfactant composition. For example, the temperature during the mixing of all components may be generally from about 40° C. to about 160° C. in one embodiment, and from about 80° C. to about 150° C. in another embodiment, and from about 120° C. to about 140° C. in another embodiment.

The preparation of the epoxy functionalized surfactant composition of the present invention, and/or any of the steps thereof, may be a batch or a continuous process. The mixing equipment used in the process may be any vessel and ancillary equipment well known to those skilled in the art.

Some of the beneficial properties or characteristics of the epoxy functionalized surfactant composition of the present invention include for example: (1) a wide variety of epoxy resin hydrophobes can be used to make the surfactant composition, (2) several epoxy resin hydrophobes can be used to ensure resin/surfactant compatibility, (3) several epoxy resin hydrophobes can be used to tune the viscosity of specific waterborne epoxy dispersion compositions, (4) several hydrophiles can be used to tune the desired surfactancy of the surfactant composition at a given temperature, (5) the surfactant composition is relatively easy to produce at large scale, and (6) the surfactant composition relatively easily dissolves in the resins being dispersed.

Another broad embodiment of the present invention is directed to providing a waterborne epoxy dispersion composition including at least: (A) an epoxy functionalized surfactant composition as described above; (B) an epoxy resin; (C) water, and optionally (D) an external surfactant.

The epoxy functionalized surfactant composition, component (A), useful in preparing the waterborne epoxy dispersion composition of the present invention can include one or more epoxy functionalized surfactant compositions as described above.

Generally, the amount of the epoxy functionalized surfactant composition, component (A), used in preparing the waterborne epoxy dispersion composition of the present invention may be in the range of from about 0.1 wt % to about 20 wt % in one embodiment, from about 0.5 wt % to about 15 wt % in another embodiment, and from 1 wt % to about 10 wt % in still another embodiment. When the amount of the epoxy functionalized surfactant composition used is at a level less than about 0.1 wt %, there is not enough surfactant to make a dispersion that is small particle sized or stable. When the amount of the epoxy functionalized surfactant composition used is at a level above about 20 wt %, the dispersions using the surfactants are easily dispersed and show great storage stability, but if the surfactant level is too high, the water sensitivity from the surfactant will deleteriously affect the performance properties of the waterborne epoxy dispersion composition.

The epoxy resin, component (B), useful for preparing the waterborne epoxy dispersion composition of the present invention can include one or more of the epoxy compounds described above with reference to the epoxy resin hydrophobe used for preparing the epoxy functionalized surfactant composition. For example, any of the aforementioned epoxy resins disclosed in Lee, H. and Neville, K., Handbook of Epoxy Resins, McGraw-Hill Book Company, New York, 1967, Chapter 2, pages 2-1 to 2-27, incorporated herein by reference, can be used herein as the epoxy resin component (B) for the epoxy resin dispersion composition of the present invention. The epoxy resin, component (B), useful for preparing the waterborne epoxy dispersion composition of the present invention can be the same as or different from the epoxy resin hydrophobe described above.

A preferred embodiment of the epoxy resin useful for the waterborne epoxy dispersion composition may include for example diglycidyl ether of bisphenol A, novolac, a 1-Type epoxy resin, and mixtures thereof.

In another preferred embodiment, commercially available epoxy resins (available from The Dow Chemical Company) that can be used as the epoxy resin useful for preparing the waterborne epoxy dispersion composition of the present invention may include for example DER™ 330, DER™ 331, DER™ 661, DER™ 664, DER™ 667, DEN™ 438, DER™ 354, and mixtures thereof. Other epoxy resins useful in the present invention may include, for example, the epoxy resins described in WO9110695, incorporated herein by reference.

Generally, the amount of epoxy resin used in preparing the waterborne epoxy dispersion composition of the present invention may be for example from about 5 wt % to about 70 wt % based on the total weight of the resin forming components of the composition in one embodiment, from about 40 wt % to about 70 wt % in another embodiment, and from 55 wt % to about 70 wt % in still another embodiment. In general, an amount of epoxy resin used in preparing the waterborne epoxy dispersion composition below about 5 wt % is a non-useful product due to the low levels of the epoxy. And generally, when the amount of epoxy resin used in preparing the waterborne epoxy dispersion composition is used at a level above about 70 wt %, the resulting product has too high of a dispersion viscosity and is generally not storage stable.

Water, component (C), is used to prepare a waterborne epoxy dispersion composition of the present invention. The water can be distilled, tap, or other source of water.

Generally, the amount of water used in the present invention may be in the range of from about 30 wt % to about 95 wt % in one embodiment, from about 30 wt % to about 60 wt % in another embodiment, and from about 30 wt % to about 45 wt % in still another embodiment.

A surfactant, component (D), can optionally be used to prepare a waterborne epoxy dispersion composition of the present invention. The surfactant is preferably a non-reactive surfactant. Various surfactants that can be used in the composition of the present invention may include for example, any conventional anionic, cationic and non-ionic surfactant, or combinations thereof.

Examples of cationic surfactants include, but are not limited thereto, cationic surfactants having various substituted or unsubstituted hydrocarbyl chains or substituted or unsubstituted heterogeneous chains, for example, substituted or unsubstituted hydrocarbyl chain lengths, such as about C8 to C22. Typical chains are alkyl, alkoxyalkyl, alkylaryl, or alkylamidoalkyl. Other cationic surfactants that can be used in the present invention composition include ammonium surfactants, substituted ammonium surfactants such as alkyl substituted ammonium surfactants, quaternary ammonium surfactants (e.g., Arquads™) pyridinium surfactants, or substituted pyridinium surfactants such as alkyl substituted pyridinium surfactants; and mixtures thereof.

Nonionic and anionic surfactants that can be used in the present invention are as described in U.S. Pat. No. 6,271,287, incorporated herein by reference. Examples of nonionic surfactants include, but are not limited thereto, commercial nonionic surfactants such as Hydropalat 3037 (available from Henkel), Emulgin PRT 100 (available from Henkel), Emulpon EL 42 (available from Witco), Disponil TA 430 (available from Henkel), Sorbanox AO (available from Witco), Atsurf 108 (available from ICI), Pluronic F108 (available from BASF Corp.), Emulgin PRT 200 (available from Henkel), and mixtures thereof. Other examples of suitable nonionic surfactants include ethoxylated mono- or dialkyl phenols such as polyethylene glycol nonyl or dinonyl phenyl ethers. An example of a commercially available ethoxylated dialkyl phenyl ether is Igepal DM 970 dinonyl phenyl ether (available from Rhone Poulenc).

Examples of anionic surfactants include, but are not limited thereto, anionic surfactants such as a long-chain alkyl alkali metal sulfosuccinate such as dioctyl sodium sulfosuccinate (e.g., Aerosol OT 75, commercially available from Cyanamid), sodium lauryl sulfate, a sulfosuccinic acid-4 ester with polyethylene glycol dodecylether disodium salt (e.g., Aerosol A 102 commercially available as from Cytec), an alkyl disulfonated diphenyloxide disodium salt such as mono- and di-alkyl disulfonated diphenyloxide, disodium salt (e.g., Dowfax 2A1 commercially available from The Dow Chemical Company), dihexyl sodium sulfosuccinate (e.g., Aerosol MA 80 commercially available from Cyanamid), polyoxy-1,2 ethandiyl-ot-tridecyl-uu-hydroxyphosphate (e.g., Rhodofac RS 610 commercially available from Rhone-Poulenc), alkylethersulfate sodium salt (e.g., Disponil FES 61 or Disponil FES 993 commercially available from Henkel), and mixtures thereof.

Generally, the amount of non-reactive surfactant, when used in the present invention, may be in the range of from 0 wt % to about 10 wt % in one embodiment, from about 0.01 wt % to about 3 wt % in another embodiment, and from about 0.1 wt % to about 2 wt % in still another embodiment. If the surfactant level is too high, the water sensitivity from the non-reactive surfactant will deleteriously affect the performance properties of the waterborne epoxy dispersion composition.

The process of making the waterborne epoxy dispersion composition includes the step of blending or admixing the epoxy functionalized surfactant composition described above, the epoxy resin described above, water and any other optional additives desired under reaction conditions such that a waterborne epoxy dispersion composition is formed.

All of the components used to prepare the waterborne epoxy dispersion composition are typically mixed and dispersed at a temperature enabling the preparation of an effective waterborne epoxy dispersion composition. For example, the temperature during the mixing of the components to form the waterborne epoxy dispersion composition may be generally from about 20° C. to about 170° C. in one embodiment, from about 40° C. to about 100° C. in another embodiment, and from about 60° C. to about 90° C. in still another embodiment.

The preparation of the waterborne epoxy dispersion composition of the present invention, and/or any of the steps thereof, may be a batch or a continuous process. The mixing equipment used in the process may be any vessel and ancillary equipment well known to those skilled in the art.

It is important to provide the necessary components in the dispersion composition as described above otherwise too much of a charge falling outside the above ranges can result in a dispersion composition that is unstable as well as provide a dispersion composition that will not blend dwell in a final coating formulation. It is also important to provide the necessary components in the dispersion composition as described above otherwise too little of a charge falling outside the above ranges can result in a dispersion composition that does not provide an effective dispersion composition.

The waterborne epoxy dispersion composition of the present invention exhibits several performance properties that make the waterborne epoxy dispersion composition useful in various end-use applications. For example, one of the beneficial properties or characteristics of the waterborne epoxy dispersion composition of the present invention can include low viscosity. For example, the viscosity of the waterborne epoxy dispersion composition of the present invention can be about 20 Pa·s or less in one embodiment, from about 0.05 Pa·s to about 20 Pa·s in another embodiment, from about 0.05 Pa·s to about 10 Pa·s in still another embodiment, and from about 0.50 Pa·s to about 5 Pa·s in yet another embodiment.

In one embodiment, when a waterborne epoxy dispersion composition is prepared using the above epoxy functionalized surfactant composition of the present invention dispersed in an epoxy resin, the resultant viscosity of the waterborne epoxy dispersion composition of the present invention can be generally from about 2 times to about 20 times lower than the viscosity of a conventional waterborne epoxy dispersion composition when using a conventional epoxy functionalized surfactant; from about 2 times to about 15 times lower in another embodiment, and from about 5 times to about 10 times lower in still another embodiment.

As a result of the waterborne epoxy dispersion composition of the present invention having a low viscosity, the waterborne epoxy dispersion composition is capable of including a high solids content (e.g., >65 wt %) as compared to known dispersions that typically have a solids content of less than 55 wt %. As the solids content of a dispersion is increased, the viscosity of the dispersion generally also increase to a usable viscosity level (e.g., >15 Pa·s). In one embodiment, the solids content of the waterborne epoxy dispersion composition of the present invention is generally greater than about 65 wt % in one embodiment, from about 40 wt % to about 65 wt % in another embodiment, and from about 55 wt % to about 65 wt % in still another embodiment.

The benefit from the high solids waterborne epoxy dispersion composition enabled by this surfactant is that the formulator can use less water in the coating formulation to achieve the desired viscosity. This means that the coating formulation will provide higher film build because of the higher solids level. In addition, the higher solids level of the current embodiment allows the formulator more latitude to include other components, which may be at lower solids levels, and still reach the necessary solids/viscosity range.

In another embodiment of the present invention, the surfactant loading in a waterborne epoxy resin dispersion composition can be reduced or minimized while the performance properties of the waterborne epoxy dispersion composition can be maintained or improved. For example, the amount of the above epoxy functionalized surfactant composition of the present invention useful in waterborne epoxy dispersion compositions can be reduced to a level of surfactant below that amount which is currently used in the art; and still, the waterborne epoxy dispersion composition of the present invention can still exhibit good properties such as storage stability.

For example, in general the surfactant loading in the waterborne epoxy resin dispersion composition can be for example, from about 1 wt % to about 15 wt % in one embodiment, from about 1.5 wt % to about 10 wt % in another embodiment, and from about 3 wt % to about 6 wt % in still another embodiment.

Another benefit of the present invention waterborne epoxy dispersion composition is the waterborne epoxy dispersion composition's dispersion stability in the presence of alcohol. For example, when blended with alcohols, the waterborne epoxy dispersion composition exhibits a significant increase in dispersion stability. This dispersion stability property is important because many end-use applications of the dispersion, for example when used in zinc rich primers for freight container coatings, the coating composition requires a large amount of alcohol to be added to the dispersion during formulation and application. In most instances, the alcohol will disrupt the stabilization of the coating composition by solubilizing the surfactant into the water/alcohol matrix. With the use of a hydrophobe having an increased Mw, the solubility of the surfactant in a water/alcohol blend is significantly reduced and thus does not disrupt stabilization. The increased stability in alcohol property of the waterborne epoxy dispersion composition also improves formulating paints for freeze thaw stability.

Another benefit of the present invention waterborne epoxy dispersion composition is that in preparing the dispersion, an operator has the flexibility of using a variety of different epoxy resins of varying molecular weights and viscosities to prepare the hydrophobe component of the above epoxy functionalized surfactant composition for use in the waterborne epoxy dispersion composition; and still achieve a decrease in the viscosity of the waterborne epoxy dispersion composition of the present invention. For example, a viscosity drop exhibited by the waterborne epoxy dispersion can be achieved using, for example a 1-Type epoxy for the hydrophobe component used for preparing the above epoxy functionalized surfactant composition. The tailoring of the hydrophobic group as described above allows an operator to use the most compatible surfactant possible with the desired hydrophobe, which in turn, improves the efficacy of the surfactant.

In another embodiment, a decrease in viscosity exhibited by the waterborne epoxy dispersion can also be achieved by for preparing the above epoxy functionalized surfactant composition using a 1-Type epoxy blended with higher Types of epoxies such as for example a 4-Type epoxy, a 7-Type epoxy, or mixtures thereof, for the hydrophobe component.

In one embodiment, the epoxy resin hydrophobe of the epoxy functionalized surfactant has a Mw greater than or equal to the resin being dispersed. For example in this embodiment, the resin being dispersed can be a 1-Type resin; and the hydrophobe used in the epoxy functionalized surfactant can be for example a 1-Type resin. In another embodiment, the epoxy resin hydrophobe of the epoxy functionalized surfactant has a Mw less than that of the resin being dispersed, but in all cases greater or equal to that of a 1-Type epoxy.

As one illustration and not be limited thereby, the Mw of the hydrophobe may be generally from about 385 Da to about 4,000 Da in one embodiment, from about 500 Da to about 2,000 Da in another embodiment, and from about 700 Da to about 1,900 Da in yet another embodiment. Correspondingly, the Mw of the resin being dispersed can may be generally from about 370 Da to about 4,000 Da.

The following Examples and Comparative Examples further illustrate the present invention in detail but are not to be construed to limit the scope thereof. All parts and percentages are by weight unless otherwise indicated.

The following standard analytical equipment and methods are used in the Examples:

Particle Size

Particle size analysis is done using a LS 13 320 Beckman Coulter, Epoxy model SOP. A small amount of dispersion (approximately [~] 0.2 g) is diluted in 20 mL of DI water then added to the coulter one drop at a time until a of 40 wt %-45 wt % obscuration is achieved. Once obscuration is at a desired level, the "Start Analysis" button on the coulter software is clicked and the particle size of the sample is measured. A print out of the particle size measurement results is then obtained from the Coulter equipment.

EEW

EEW (epoxy equivalent weight) is measured using a Metrohm 801_1 Robotic USB sample processor XL and two samples of 800 Dosino for the reagents. The reagents used are perchloric acid in acetic acid 0.10 N and tetraethylammonium bromide. The electrode for the analysis is an 854 Iconnect. For each sample 1 g of dispersion is weighed out into a plastic sample cup. Then 30 mL of THF (tetrahydrofuran) is first added and mixed for 1 minute (min) to break the shell on the dispersion. Next, 32 mL of glacial acetic acid is added and mixed for another 1 min to fully dissolve the sample. The sample is then placed on the auto sampler and all relevant data (e.g., sample ID, sample weight) is added to the software. From here the start button is clicked to start the titration. Thereafter, 15 mL of tetraethylammonium bromide is added, and then the perchloric acid is slowly added until a potentiometric endpoint is reached. Once the potentiometric endpoint is reached, the software calculates an EEW value based on the amount of sample and perchloric acid used.

Viscosity

Viscosity is measured using a Brookfield RVDV-I Prime Viscometer. The sample is poured into a 100 mL glass wide mouth jar. Using a speed of 10 revolutions per minute (RPM), viscosity is measured using the appropriate spindle (#2-#7) that gives a read out of 15-85% in torque in order to achieve the best possible result. The analysis is complete when the torque % and viscosity readout are both stable for ·30 seconds (s).

Percent Acid

Percent acid (% acid) is measured using a 25 mL burette, magnetic stir plate, magnetic stir bar, flacktek DAC 150.1 FVZ-K speed mixer, sodium hydroxide solution N/10, acetone and phenolphthalein in isopropanol. The sample is weighed out into a 100 max speed mixer cup, ~4 g, and acetone is added (sufficient to fill the speed mixer cup ¾ full) as the carrier fluid. The sample and acetone are placed in the speed mixer at 3500 RPM for 4 min; more mixing time may be needed for higher Mw samples. Once speed mixed, 4 drops of phenolphthalein in isopropanol is added to the sample as a color indicator. A small stir bar is placed in the sample cup and the sample cup is placed on the magnetic stirrer. The contents of the sample cup are stirred on low speed. Then the sodium hydroxide solution is added to the cup contents until a color end point is reached. Using the sample weight and the amount (in mL) of sodium hydroxide solution used, the % acid is calculated as follows:

% acid=(mL titrant×4.502)/(sample weight (g)×10)

The above equation is the simplified version of the original equation for calculating % acid. The original equation is as follows:

% Acid [wt %]=$N*f*45.02*(V2-V1)/10*W$ wherein N=theoretical normality of the NaOH titration reagent [mole/1],
F=normality correction factor,
45.02=molecular mass of the acid functional group (COOH) [g/mole],
V1=blank volume of reagent [mL],
V2=volume of reagent [mL] needed in the sample titration, and
W=sample mass [g].

Molecular Weight (Mw)

The samples are analyzed by conventional size-exclusion chromatography (SEC). Results are based on calibration with linear polystyrene standards. The following calibrations are used:
Sample Preparation: 2 mg/mL in N,N-dimethylformamide (DMF)+lithium nitrate, 4 g/L; solutions were filtered through 0.45 µm nylon syringe filter prior to injection.
Pump: Waters Model 2690 at a nominal flow rate of 1.0 mL/min.
Eluent: Fisher Scientific N,N dimethylformamide+ lithium nitrate, 4 g/L.
Injector: Waters Model 2690 set to inject 50 µL.
Columns: Two PolymerLabs 5 µm Mixed D columns batch 39.32, 57.50, held at 35° C.
Detection: Shodex RI-201 containing differential refractive index and Waters dual wavelength UV detector, with wavelength set to 280 nm.
Data system: PolymerLabs Cirrus v. 3.3.
Calibration: 10 narrow polyethylene oxide (PEO) standards from PolymerLabs, fit to a 1st order polynomial curve.

SURFACTANT EXAMPLE 1

Synthesis of Surfactant Using Hydrophobe with EEW 185

An epoxy functionalized surfactant composition of the present invention is prepared by reacting a hydrophilic moiety and an epoxy hydrophobe in accordance with the following general procedure:
A 1 L three neck round bottom glass reactor is used in this example. An atmosphere of dry nitrogen is kept in the reactor throughout the operation. Polyethylene glycol (PEG), 165.88 g, having a Mw of 4,600 is charged into the reactor. PEG is a solid addition at room temperature (RT) and is heated with mechanical stirring. The stirred material is heated up to a temperature of 140° C. at a rate of 0.8° C./minute (maximum capacity). At 140±3° C., 19.21 g of 2-dodecene-1-yl succinic anhydride is added to the mixture. The temperature of the mixture is maintained at below 145° C. A sample of the reaction mixture is taken from the reactor for acid content titration (% acid:target 1.76 range 1.76 to 2.10: typically 3.5 hours at 1 L scale).
An epoxy hydrophobe, DER 330, 64.91 g, is added to the reactor (the epoxy is added in drops at RT). The reactor contents are heated up to 140° C. At 140±–3° C., 0.1 g of A1 catalyst (ethyltriphenylphosphonium acetate) is added to the reactor material. The reactor material is kept at adiabatic conditions to reach a peak exotherm temperature of 150° C. At about 30 minutes (min) after exotherm, a 2.0 g sample is taken from the reactor for an acid titration measurement and the acid value of the reactor material is tracked until the acid reduces to ~% acid <0.01%. The heating and the mixing of the reactor contents is turned off; and the reaction contents are poured into a 500 mL collection vessel.
The surfactant made is designated as epoxy surfactant "E-PEG4600-330" to identify the epoxy—PEG reaction product; and to identify that 4600 Mw PEG and DER 330 epoxy are used to form the product.

SURFACTANT EXAMPLE 2

Synthesis of Surfactant Using Hydrophobe with EEW 485

An epoxy functionalized surfactant composition of the present invention is prepared similarly to Surfactant Example 1 except that 46.67 g of PEG having a Mw of 4,600 is charged into the reactor and 5.41 g of 2-dodecene-1-yl succinic anhydride is added in the first step of the reaction. An epoxy hydrophobe Experimental 1-Type XZ 92585 resin (EEW 485), 47.92 g, is added to the rector in the second step of the reaction.
The surfactant made is designated as epoxy surfactant "E-PEG4600-585" to identify the epoxy—PEG reaction product; and to identify that 4600 Mw PEG and XZ 92585 epoxy are used to form the product.

SURFACTANT EXAMPLE 3

Synthesis of Surfactant Using Hydrophobe with EEW 530

An epoxy functionalized surfactant composition of the present invention is prepared similarly to Surfactant Example 1 except that 44.30 g of PEG having a Mw of 4,600 is charged into the reactor and 5.13 g of 2-dodecene-1-yl succinic anhydride is added in the first step of the reaction. An epoxy hydrophobe DER 661 resin (EEW 530), 50.56 g, is added to the rector in the second step of the reaction.
The surfactant made is designated as epoxy surfactant "E-PEG4600-661" to identify the epoxy—PEG reaction product; and to identify that 4600 Mw PEG and DER 661 epoxy are used to form the product.

SURFACTANT EXAMPLE 4

Synthesis of Surfactant Using Hydrophobe with EEW 915

An epoxy functionalized surfactant composition of the present invention is prepared similarly to Surfactant Example 1 except that 32.43 g of PEG having a Mw of 4,600 is charged into the reactor and 3.76 g of 2-dodecene-1-yl succinic anhydride is added in the first step of the reaction. An epoxy hydrophobe DER 664 resin (EEW 915), 63.81 g, is added to the rector in the second step of the reaction.

The surfactant made is designated as epoxy surfactant "E-PEG4600-664" to identify the epoxy—PEG reaction product; and to identify that 4600 Mw PEG and DER 664 epoxy are used to form the product.

DISPERSION EXAMPLE 5

Preparation of Waterborne Epoxy Dispersion Using Surfactant Prepared in Surfactant Example 1

A 9.7 Kg batch of DER 331 and 0.3 Kg of surfactant E-PEG4600-330 were pre-blended in a jacketed reactor at 95° C. Once uniform, the material was cooled to 80° C. The cooled pre-blend material was then pumped to a rotor stator mixer at 60 g/min. A stream of E-Sperse 100 anionic surfactant (60% active) was pumped to the mixer at 1.75 g/min. Water was also added to the mixer at 10 g/min.

The resulting high internal phase emulsion was then diluted with additional water to achieve a 58.05% solids dispersion. The mean particle size of the dispersion achieved was ~500 nm with 90% of the total particles are below 800 nm ("D90% cut off"). The resulting dispersion had a viscosity of 1.256 Pa-s.

DISPERSION EXAMPLE 6

Preparation of Waterborne Epoxy Dispersion Using Surfactant Prepared in Surfactant Example 1

Dispersion Example 6 was carried out similarly to Dispersion Example 5 except 9.7 Kg of DEN 438 and 0.3 Kg of surfactant E-PEG4600-330 were pre-blended in a jacketed reactor at 95° C.

The resulting 59.94% solids dispersion had a mean particle size of ~500 nm with a D90% cut off at <800 nm. The resulting dispersion had a viscosity of 4.240 Pa-s.

DISPERSION EXAMPLE 7

Preparation of Waterborne Epoxy Dispersion Using Surfactant Prepared in Surfactant Example 1

Dispersion Example 7 was carried out similarly to Dispersion Example 5 except 9.5 Kg of Experimental 1-Type XZ 92585 and 0.5 Kg of surfactant E-PEG4600-330 were pre-blended in a jacketed reactor at 95° C.

The resulting 55.72% solids dispersion had a mean particle size of ~500 nm with a D90% cut off at <800 nm. The resulting dispersion had a viscosity of 1.012 Pa-s.

DISPERSION EXAMPLE 8

Preparation of Waterborne Epoxy Dispersion Using Surfactant Prepared in Surfactant Example 1

Dispersion Example 8 was carried out similarly to Dispersion Example 5 except 9.02 Kg of a pre-blend of DER 667 (80%), DER 330 (5%) and Propyl Cellosolv (15%) (available from The Dow Chemical Company) and 0.98 Kg of surfactant E-PEG4600-330 were pre-blended in a jacketed reactor at 95° C.

The resulting 57.00% solids dispersion had a mean particle size of ~750 nm with a D90% cut off at <1000 nm. The resulting dispersion had a viscosity of 1.160 Pa-s.

DISPERSION EXAMPLE 9

Preparation of Waterborne Epoxy Dispersion Using Surfactant Prepared in Surfactant Example 2

A 9.7 Kg batch of DER 331 and 0.3 Kg of surfactant E-PEG4600-585 were pre-blended in a jacketed reactor at 95° C. Once uniform, the material was cooled to 80° C. The cooled pre-blend material was then pumped to a rotor stator mixer at 60 g/min. A stream of E-Sperse 100 anionic surfactant (60% active) was pumped to the mixer at 1.75 g/min. Water was also added to the mixer at 10 g/min.

The resulting high internal phase emulsion was then diluted with additional water to achieve a 59.94% solids dispersion. The mean particle size of the dispersion achieved was ~500 nm with a D90% cut off at <800 nm. The resulting 59.88% solids dispersion had a viscosity of 0.792 Pa-s.

DISPERSION EXAMPLE 10

Preparation of Waterborne Epoxy Dispersion Using Surfactant Prepared in Surfactant Example 2

Dispersion Example 10 was carried out similarly to Dispersion Example 5 except 9.7 Kg of DEN 438 and 0.3 Kg of surfactant E-PEG4600-585 were pre-blended in a jacketed reactor at 95° C.

The resulting 60.11% solids dispersion had a mean particle size of ~500 nm with a D90% cut off at <800 nm. The resulting dispersion had a viscosity of 1.656 Pa-s.

DISPERSION EXAMPLE 11

Preparation of Waterborne Epoxy Dispersion Using Surfactant Prepared in Surfactant Example 2

Dispersion Example 11 was carried out similarly to Dispersion Example 5 except 9.5 Kg of Experimental 1-Type XZ 92585 and 0.5 Kg of surfactant E-PEG4600-585 were pre-blended in a jacketed reactor at 95° C.

The resulting 55.70% solids dispersion had a mean particle size of ~500 nm with a D90% cut off at <800 nm. The resulting dispersion had a viscosity of 0.264 Pa-s.

DISPERSION EXAMPLE 12

Preparation of Waterborne Epoxy Dispersion Using Surfactant Prepared in Surfactant Example 3

A 9.7 Kg batch of DER 331 and 0.3 Kg of surfactant E-PEG4600-661 were pre-blended in a jacketed reactor at 95° C. Once uniform, the material was cooled to 80° C. The cooled pre-blend material was then pumped to a rotor stator mixer at 60 g/min. A stream of E-Sperse 100 anionic surfactant (60% active) was pumped to the mixer at 1.75 g/min. Water was also added to the mixer at 10 g/min.

The resulting high internal phase emulsion was then diluted with additional water to achieve a 60.41% solids dispersion. The mean particle size of the dispersion achieved was ~500 nm with a D90% cut off at <800 nm. The resulting 60.41% solids dispersion had a viscosity of 1.080 Pa-s.

DISPERSION EXAMPLE 13

Preparation of Waterborne Epoxy Dispersion Using Surfactant Prepared in Surfactant Example 3

Dispersion Example 13 was carried out similarly to Dispersion Example 5 except 9.7 Kg of DEN 438 and 0.3 Kg of surfactant E-PEG4600-661 were pre-blended in a jacketed reactor at 95° C.

The resulting 60.20% solids dispersion had a mean particle size of ~500 nm with a D90% cut off at <800 nm. The resulting dispersion had a viscosity of 1.578 Pa-s.

DISPERSION EXAMPLE 14

Preparation of Waterborne Epoxy Dispersion Using Surfactant Prepared in Surfactant Example 3

Dispersion Example 14 was carried out similarly to Dispersion Example 5 except 9.5 Kg of Experimental 1-Type XZ 92585 and 0.5 Kg of surfactant E-PEG4600-661 were pre-blended in a jacketed reactor at 95° C.

The resulting 54.34% solids dispersion had a mean particle size of ~500 nm with a D90% cut off at <800 nm. The resulting dispersion had a viscosity of 0.220 Pa-s.

DISPERSION EXAMPLE 15

Preparation of Waterborne Epoxy Dispersion Using Surfactant Prepared in Surfactant Example 4

A 9.7 Kg batch of DER 331 and 0.3 Kg of surfactant E-PEG4600-664 were pre-blended in a jacketed reactor at 95° C. Once uniform, the material was cooled to 80° C. The cooled pre-blend material was then pumped to a rotor stator mixer at 60 g/min. A stream of E-Sperse 100 anionic surfactant (60% active) was pumped to the mixer at 1.75 g/min. Water was also added to the mixer at 10 g/min.

The resulting high internal phase emulsion was then diluted with additional water to achieve a 60.25 wt % solids dispersion. The mean particle size of the dispersion achieved was ~500 nm with a D90% cut off at <800 nm. The resulting 60.25 wt % solids dispersion had a viscosity of 0.872 Pa-s.

DISPERSION EXAMPLE 17

Preparation of Waterborne Epoxy Dispersion Using Surfactant Prepared in Surfactant Example 4

Dispersion Example 17 was carried out similarly to Dispersion Example 5 except 9.5 Kg of Experimental 1-Type XZ 92585 and 0.5 Kg of surfactant E-PEG4600-664 were pre-blended in a jacketed reactor at 95° C.

The resulting 54.46% solids dispersion had a mean particle size of ~500 nm with a D90% cut off at <800 nm. The resulting dispersion had a viscosity of 0.116 Pa-s.

DISPERSION EXAMPLE 18

Preparation of Waterborne Epoxy Dispersion Using Surfactant Prepared in Surfactant Example 4

Dispersion Example 18 was carried out similarly to Dispersion Example 5 except 9.02 Kg of a pre-blend of DER 667 (80 wt %), DER 330 (5 wt %) and Propyl Cellosolv (15 wt %) (available from The Dow Chemical Company) and 0.98 Kg of surfactant E-PEG4600-664 were pre-blended in a jacketed reactor at 95° C.

The resulting 57.12 wt % solids dispersion had a mean particle size of ~750 nm with a D90% cut off at <1000 nm. The resulting dispersion had a viscosity of 0.380 Pa-s.

Figure 2:
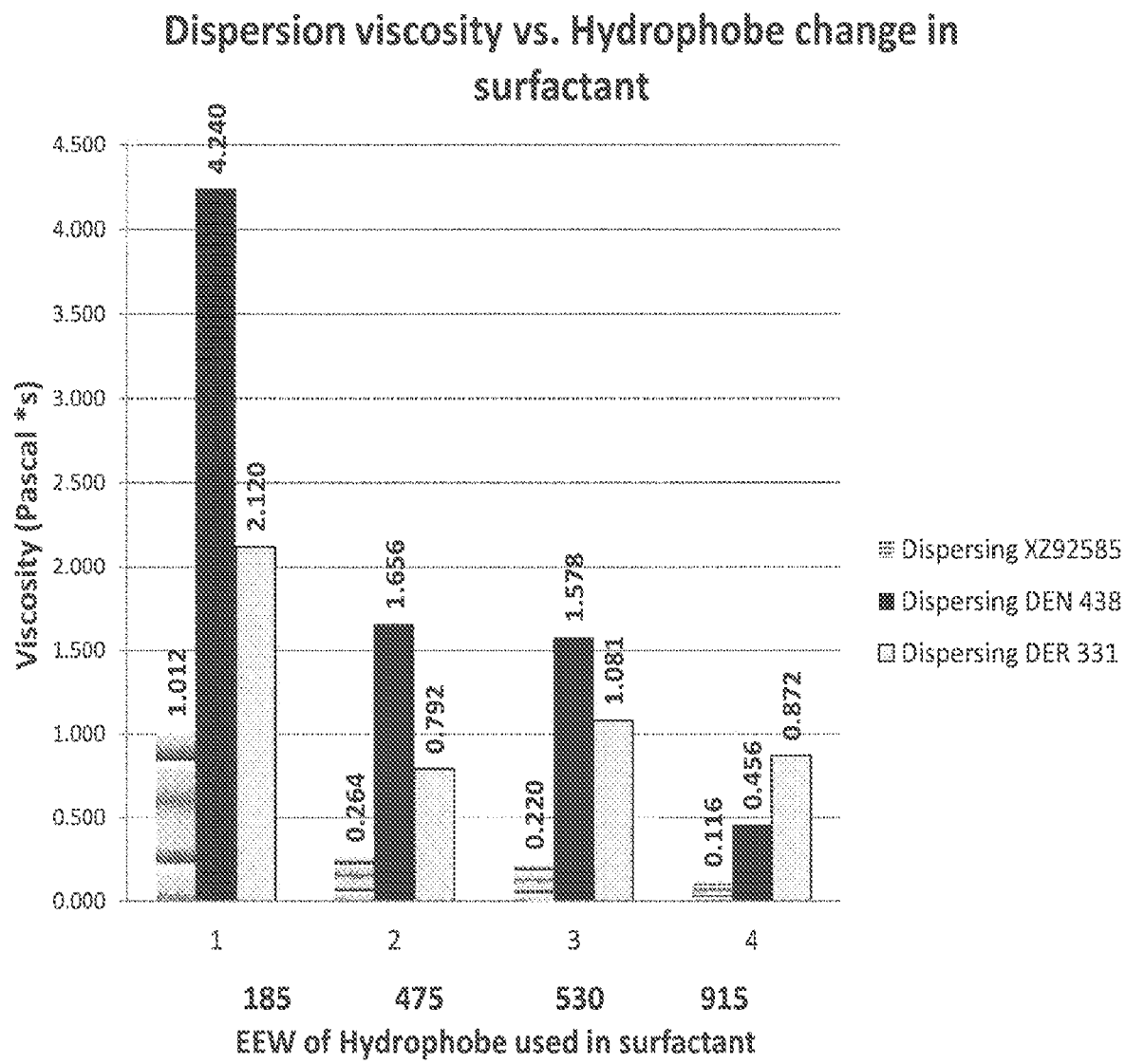
FIG. 2 is a graphical illustration showing dispersion viscosity versus hydrophobe Mw of various compositions. As the EEW of the hydrophobe used in making the surfactant increases, the viscosity of the dispersion decreases. This is seen when dispersing a 1-Type resin; a standard commercial novolac resin such as DEN 438; and a liquid epoxy resin such as DER 331. The mean particle size of all three dispersions shown in FIG. 2 is maintained between 450 nanometers (nm) and 650 nm. The solids level of the resin of Example 1 (a 1-Type resin) is maintained at 55 wt %. The dispersions of Comparative Example A and Comparative Example B are maintained at 60 wt % solids.

Table I describes, and FIG. 2 shows, the effect on the viscosity property of a waterborne epoxy dispersion when using various hydrophobes with varying Mw in making a surfactant that, in turn, is used in making the waterborne epoxy dispersion.

TABLE I

Waterborne Epoxy Dispersions

| Altered Hydrophobe Dispersions | | Dispersion Viscosity in Pascal * s (% Solids) | | | |
|---|---|---|---|---|---|
| Polymer Phase Dispersed in Water | DER 667/DER 330 | 1.160 (57.0%) Dispersion Example 8 | | | 0.380 (57.12%) Dispersion Example 18 |
| | Experimental 1-Type, EEW 485 | 1.012 (55.72%) Dispersion Example 7 | 0.264 (55.7%) Dispersion Example 11 | 0.220 (54.34%) Dispersion Example 14 | 0.116 (54.46%) Dispersion Example 17 |
| | DEN438 | 4.240 (59.94%) Dispersion Example 6 | 1.656 (60.11%) Dispersion Example 10 | 1.578 (60.20%) Dispersion Example 13 | 0.456 (60.50%) Dispersion Example 16 |
| | DER331 | 1.256 (58.05%) Dispersion Example 5 Surfactant Example 1 185 EEW | 0.792 (59.88%) Dispersion Example 9 Surfactant Example 2 485 EEW | 1.080 (60.41%) Dispersion Example 12 Surfactant Example 3 530 EEW | 0.872 (60.25%) Dispersion Example 15 Surfactant Example 4 915 EEW |

DISPERSION EXAMPLE 16

Preparation of Waterborne Epoxy Dispersion Using Surfactant Prepared in Surfactant Example 4

Dispersion Example 16 was carried out similarly to Dispersion Example 5 except 9.7 Kg of DEN 438 and 0.3 Kg of surfactant E-PEG4600-664 were pre-blended in a jacketed reactor at 95° C.

The resulting 60.50 wt % solids dispersion had a mean particle size of ~500 nm with a D90% cut off at <800 nm. The resulting dispersion had a viscosity of 0.456 Pa-s.

The invention claimed is:

1. An epoxy functionalized surfactant composition comprising a reaction product of:
   (a) a hydrophilic material comprising an intermediate material comprising a reaction product of: (i) polyethylene glycol having the chemical structure RO—$(CH_2$—$CH_2$—$O)_m$—H, wherein R is a hydrogen, a methyl group, an ethyl group, or a C3-C20 group, and m is from 1 to 452, and (ii) an anhydride of a dicarboxylic acid comprising 2-dodecene-1-yl-succinic anhydride; and
   (b) an epoxy resin hydrophobe material comprising diglycidyl ether bisphenol A having the following chemical structure:

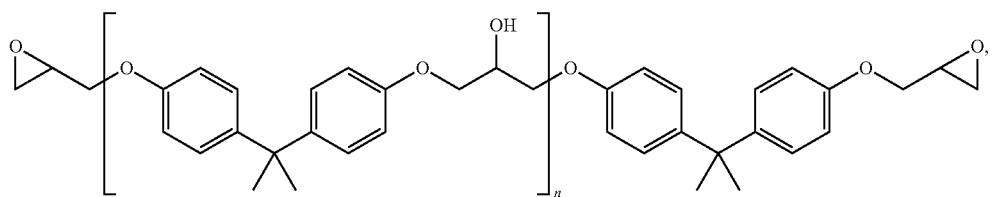

wherein n is from 0 to 60.

2. An epoxy resin composition comprising:
(A) an epoxy functionalized surfactant composition of claim 1; and
(B) an epoxy resin.

3. A waterborne epoxy dispersion composition comprising admixing:
(A) an epoxy functionalized surfactant composition of claim 1;
(B) an epoxy resin; and
(C) water.

4. The epoxy functionalized surfactant composition of claim 1, wherein the diglycidyl ether bisphenol A has an epoxy equivalent weight (EEW) of from 475 to 915.

5. The epoxy functionalized surfactant composition of claim 1, wherein n is from 1.6 to 12.9.

* * * * *